(12) United States Patent
Greene

(10) Patent No.: US 8,207,854 B2
(45) Date of Patent: *Jun. 26, 2012

(54) SHIPPING CONTAINER INTEGRITY DEVICE AND SYSTEM

(75) Inventor: Paul Llewellyn Greene, Leesburg, VA (US)

(73) Assignee: Mach 1 Development, Inc., Leesburg, VA (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/368,194

(22) Filed: Feb. 9, 2009

(65) Prior Publication Data

US 2010/0201486 A1    Aug. 12, 2010

(51) Int. Cl.
*G08B 13/14* (2006.01)

(52) U.S. Cl. ............. 340/572.1; 340/572.7; 340/572.8

(58) Field of Classification Search .......... 340/572.1
See application file for complete search history.

(56) References Cited

U.S. PATENT DOCUMENTS

| | | | |
|---|---|---|---|
| 4,654,658 A | 3/1987 | Walton | |
| 5,831,531 A | 11/1998 | Tuttle | |
| 6,069,563 A | 5/2000 | Kadner et al. | |
| 6,265,973 B1 | 7/2001 | Brammall et al. | |
| 6,662,642 B2 | 12/2003 | Breed et al. | |
| 6,747,558 B1 | 6/2004 | Thorne et al. | |
| 7,036,729 B2 | 5/2006 | Chung | |
| 7,239,238 B2 | 7/2007 | Tester et al. | |
| 7,342,497 B2 | 3/2008 | Chung et al. | |
| 7,348,886 B2 | 3/2008 | Himberger et al. | |
| 7,364,089 B2 | 4/2008 | Claessens et al. | |
| 7,385,510 B2 | 6/2008 | Childress et al. | |
| 2002/0130778 A1 | 9/2002 | Nicholson | |
| 2004/0041705 A1 | 3/2004 | Auerbach et al. | |
| 2004/0113782 A1 | 6/2004 | Auerbach et al. | |
| 2005/0051624 A1* | 3/2005 | Kipp et al. | 235/385 |
| 2005/0242950 A1 | 11/2005 | Lindsay et al. | |
| 2006/0202824 A1 | 9/2006 | Carroll et al. | |
| 2007/0146144 A1* | 6/2007 | Norman et al. | 340/572.8 |

* cited by examiner

*Primary Examiner* — George Bugg
*Assistant Examiner* — Kerri McNally
(74) *Attorney, Agent, or Firm* — Da Vinci's Notebook, LLC

(57) ABSTRACT

Disclosed is a remotely monitorable shipping container security and integrity system and radio frequency identification device. The system permits remote monitoring of shipping containers via RFID devices capable of data storage. The RFID devices are adapted to become at least partially non-functional in the event of substantial tampering.

36 Claims, 13 Drawing Sheets

SHIPPING CONTAINER INTEGRITY DEVICE AND SYSTEM

FIELD OF THE INVENTION

The present invention relates to the field of security and more specifically to the field of signal-based container integrity.

BACKGROUND

The most prevalent use for intermodal containers is for the shipment of goods throughout the world. These goods are boxed and/or palletized and placed in the container. The container doors are closed, and locked via a latch. Usually a seal made of plastic or metal is affixed to show that the container is sealed. The container is then placed on a chassis, and leaves the yard to be transported to the final destination.

Upon arrival at another intermodal facility, the container often passes through a portal containing a line scan camera to collect the container number. Upon arriving at a check-in kiosk, a second camera attempts to zoom in to the seal on the container door. The numbers are then checked and verified against a waybill as a means to determine if the contents of the container are intact. In the instance where the numbers do not match, the truck driver is queried as to whether or not s/he is aware of any tampering with the container. In the absence of facts to the contrary, the assumption is that a person mistakenly in entered the waybill number.

According to the United States Department of Transportation, theft of the contents of intermodal containers costs companies between $2,000,000,000 and $10,000,000,000 per year. This wide array of figures is due to reluctance on the part of the transportation industry to fully disclose the true and full costs. The primary reasons cited include fear of higher insurance rates, potential fodder for competitors, and the belief that theft is just the cost of doing business.

The current process of check-in and check-out of an intermodal container may entail a remote visual inspection of the container seal via camera. On many occasions the truck driver must exit the truck, move to the rear of the container, and manually manipulate the seal so that the camera operator can read the serial number on the seal. At times, the driver is required to read the seal number out loud to the camera operator. The average check-in/check-out time is approximately two minutes.

Information relevant to attempts to address these problems can be found in U.S. Pat. Nos. 5,831,531; 6,069,563; 6,265,973; 6,747,558; 7,036,729; 7,239,238; 7,342,497; 7,348,886; 7,364,089; and 7,385,510; and U.S. Published Patent Applications No. 2004/0041705; 2004/0113782; and 2006/0202824. However, each one of these references suffers from one or more disadvantages. There is a need for a system capable of simplified remote monitoring of containers, both stationary and in transit; inexpensive monitoring of containers; and cross-checking the integrity of container data.

SUMMARY

The present invention is directed to a remotely monitorable shipping container system. The remotely monitorable shipping container system includes a shipping container, a radio frequency identification device, and a central authority. The shipping container includes vessels designed for shipments of goods, particularly intermodal containers. The term "shipping" is meant to include all aspects of transport of one container from one geographic location to another and is not meant to relate solely to transport by ship or other water-traversing vehicle. The container is of the variety that accepts internal contents and includes a holed latch for a lock or other security device.

The radio frequency device is a transmission unit for placement within a shipping container latch or other actuating barrier. The radio frequency transmission device includes a reception block with a surface that supports—internally, sub-internally, or facially—a chipset and one or more antennas. An elongate mast assembly extends from the reception block and includes a differential width that increases with distance from the reception block. At least one of the antennas includes a separable portion that extends to a separable portion of the mast assembly. A preferred embodiment of the mast assembly includes a mast and mast cap that fits over a terminus of the mast. Separation of the mast assembly severs the antenna and prevents further signaled transmissions to or from the device through the severed antenna.

Versions of the radio frequency device may further include one or more secondary closed loop antennae that communicate with the chipset. It is preferred that versions of the device with a secondary antenna also include a chipset with a secondary integrated circuit. The secondary antenna may have a signaled wave transmission character, e.g. frequency, amplitude, magnitude, distinct from the primary antenna; the secondary antenna frequency is preferably of a wave character that emissions travel a distance lower in magnitude than that of the primary antenna.

The system may further include a transmission module adapted to write and read data to and from antennae located on the transmission device. Any number of transmission modules may be used of varying portability and various permissions to access information within the device chipset.

Therefore, it is an aspect of the present invention to provide a system capable of simplified remote monitoring of containers, both stationary and in transit.

It is a further aspect of the present invention to provide a system and device capable of inexpensive monitoring of containers.

It is a further aspect of the present invention to provide a system and device capable of cross-checking the integrity of container data.

It is a further aspect of the present invention to provide a system and device capable of transmissions/reception of container data along substantial distances.

It is a further aspect of the present invention to provide a system and device capable of data entry/reading upon/from one or more electronic media.

It is a further aspect of the present invention to provide a system and device capable of destruction of signal transfer capability of at least one data transfer medium upon tampering.

It is a further aspect of the present invention to provide a system and device capable of use without a dedicated power source.

It is a further aspect of the present invention to provide a system and device capable of use with a minimal power source.

It is a further aspect of the present invention to provide a system and device capable of quick affixation and removal.

It is a further aspect of the present invention to provide a system and device capable of use with data protection schemes, both inherent and interactively escalating.

These aspects of the invention are not meant to be exclusive. Furthermore, some features may apply to certain versions of the invention, but not others. Other features, aspects, and advantages of the present invention will be readily appar-

DETAILED DESCRIPTION

Figure 1:
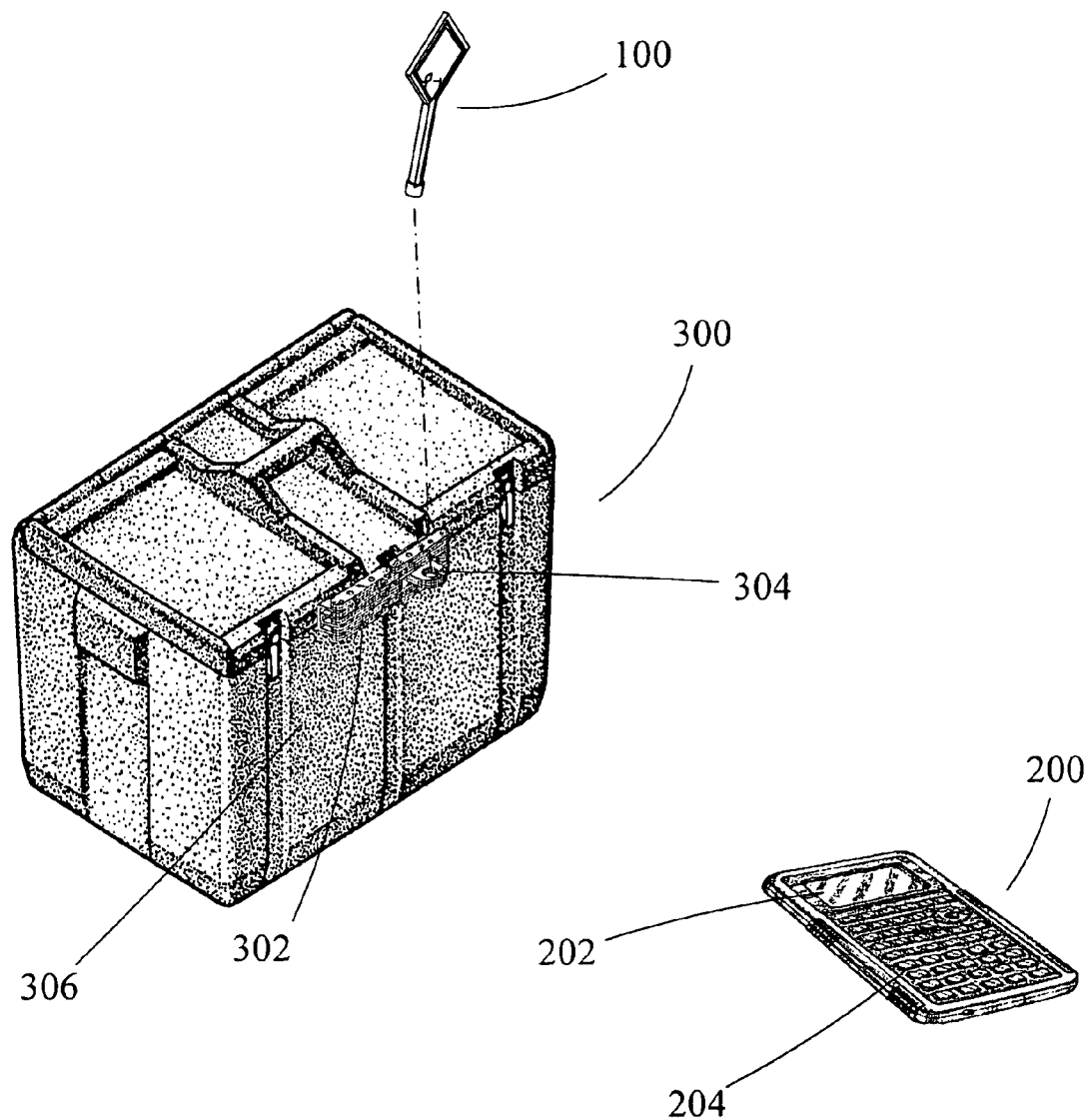
FIG. 1 is a perspective view of the system of the present invention.

Referring first to FIG. 1, a basic embodiment of the remotely monitorable shipping container system 400 is shown. The remotely monitorable shipping container system 400 includes a shipping container 300, a radio frequency identification (RFID) device 100, a transmission module 200, and a central authority (not shown). The shipping container 300 includes any object suited to accept products for internal transport. Examples of shipping containers for use with the present invention include intermodal containers, rolling stock, transport trailers, storage containers, boxes, and the like. The shipping container 300 of the present invention includes an actuating portion that discloses the interior of the container 300 in one position and prevents substantial access to the interior of the container in a second position. The actuating portion may include a top cover, door, movable sidewall, and the like. A protrusion, such as a latch 302, is positioned proximate to the actuating portion of the shipping container 300 and includes an aperture 304 to receive a security device, e.g. a padlock. The protrusion 302 is adapted to prevent body actuation in the event of placement of a security device within the protrusion aperture 304. The system 400 may use a single container 300 or multiple containers 300.

Figure 2:
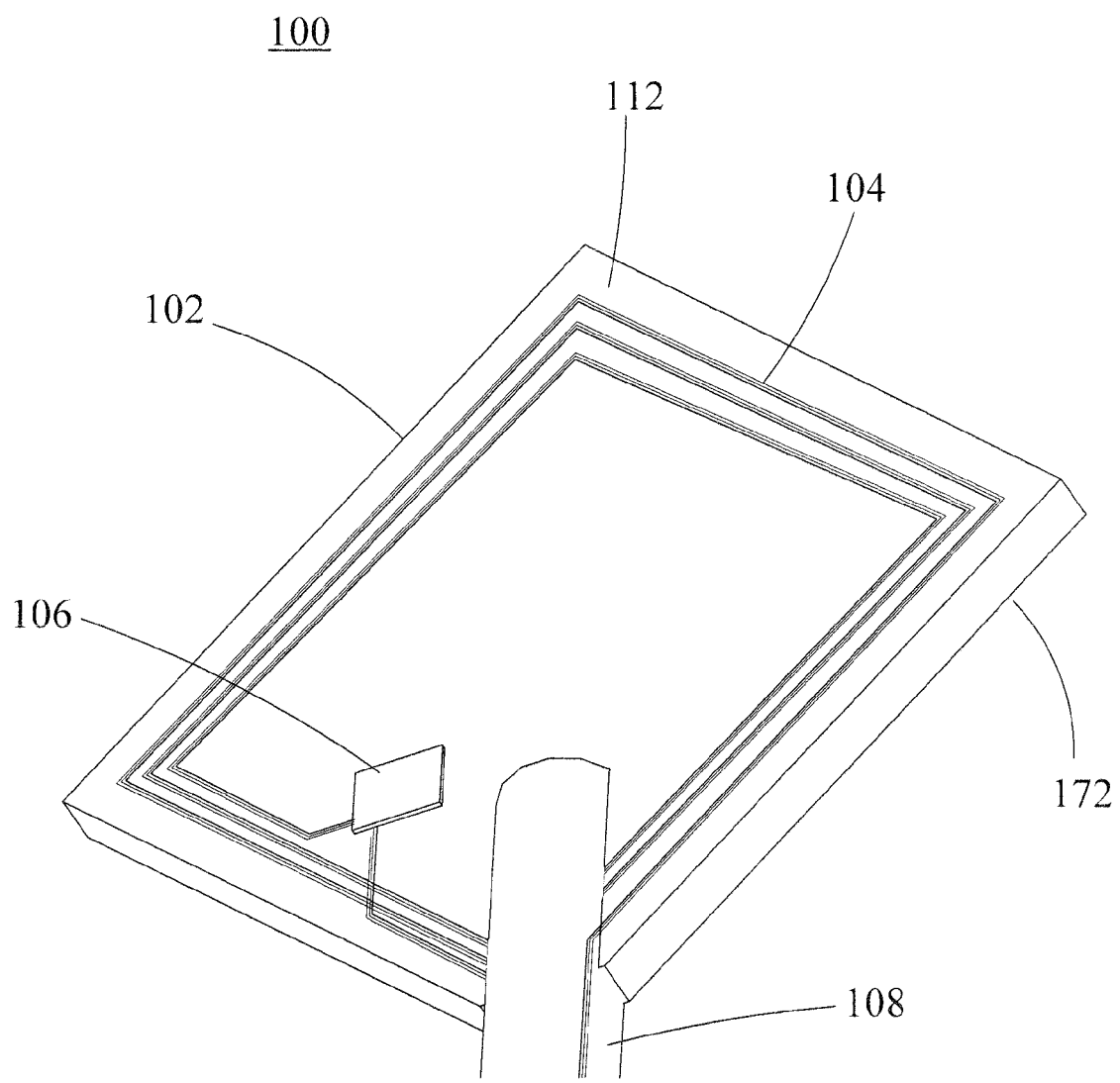
FIG. 2 is a partial, perspective view of the device of the present invention.

The RFID device 100 is positioned in the protrusion aperture 304 of the container 300. Turning now to FIG. 2, the RFID device 100 includes a reception block 102 with a reception surface 112. Embodiments of the present invention may feature a substantially-planar reception surface 112. By substantially planar it is meant that the reception surface 112 is flat to a degree that allows a primary antenna 104 to be positioned on the reception surface 112 for transmission and acceptance of data signals. The data signals, i.e. signaled transmissions, of the present invention may include radio transmissions, electromagnetic transmissions, and other broadcasts capable of conveying information, power, or any combination of the two through an open medium. References within this disclosure to one variety of transmission includes all other transmissions capable of use by the mentioned device or like device, particularly references to electromagnetic or radio signals. When one or more antennae are placed on the reception surface, the substantially planar reception surface 112 is appropriately sized to create a large angle of incidence to accept incoming signals; this planar nature is particularly important as the RFID device 100 is adapted to be used in conjunction with large metal containers in the LF (e.g., frequencies less than 135 KHz complying with ISO/IEC 18000-2), HF (e.g., 13.56 MHz complying with ISO/IEC 18000-3, ISO/IEC 15693 & ISO/IEC 14443), UHF (e.g., 433 MHz complying with ISO/IEC 18000-7 & 860 MHz to 960 MHz complying with ISO/IEC 18000-6), VHF and Microwave (e.g., 2.45 GHz complying with ISO/IEC 18000-4) bands. A preferred transmission character includes transmissions of approximately of those in the UHF spectrum (e.g., UHF used in accordance with the ISO 18000-6C standard). The present invention is not limited by the wavelength or frequency character of its signaled communications, and may utilize LF, HF, UHF, Microwave, and other transmissions across the frequency spectrum of RFID. Examples of the spectrum may include but are not limited to the entire range defined within the ISO/IEC 18000 parameters for air interface communication: part 1 through part 7. The shape of the reception block 102 can include any dimensions suitable to achieve the purposes of the present invention. A significant width is preferred for the RFID device 100 such that placement of the RFID device 100 within the container latch assembly hole positions the reception block 102 against a wall of the container in a manner that prevents substantial axial rotation of the RFID device 100. The width of the reception block 102 includes dimensions that prevent the RFID device from slipping through a latch assembly hole. Preferred dimensions of the reception block 104 permit the RFID device 100 to rest in a self-supporting fashion about an upper surface of a latch or other holed closing mechanism.

The reception block 102 may be constructed of any durable materials suitable for the use of the electronic equipment of the present invention. Wood is a preferred construction material in some embodiments; while other embodiments preferably utilize a thermoset plastic suitable to shield electronics from relatively adjacent metallic surfaces proximate to which the present invention may operate. The preferred dimensions of the reception block include a 5.1 cm to 25.4 cm height; a 5.1 cm to 25.4 cm width; and a 1.3 cm to 1.9 cm depth. The dimensions of the reception block 102 are preferably such that, when in contact with a substantially planar container sidewall, the RFID device 100 will exhibit minimal turning characteristics. A backwall 172 with a substantially planar surface or bearing suitably positioned protrusions may assist the present invention in maintaining a stable orientation in times of substantially container motion. The relatively narrow depth, when viewed in conjunction with the width, allows substantially static placement close to the container sidewall. By substantially planar container sidewall, it is meant that the container sidewall presents a surface having multiple planar structural points that may include a flat sidewall, a sidewall with multiple planar outcroppings, or other surface offering two points that are generally planar and positioned proximate to a bolt hole. It is preferred that the reception block 102 prevents the RFID device from axial rotations greater than 180 degrees, and more preferably from rotations greater than 30 degrees.

Figure 3:
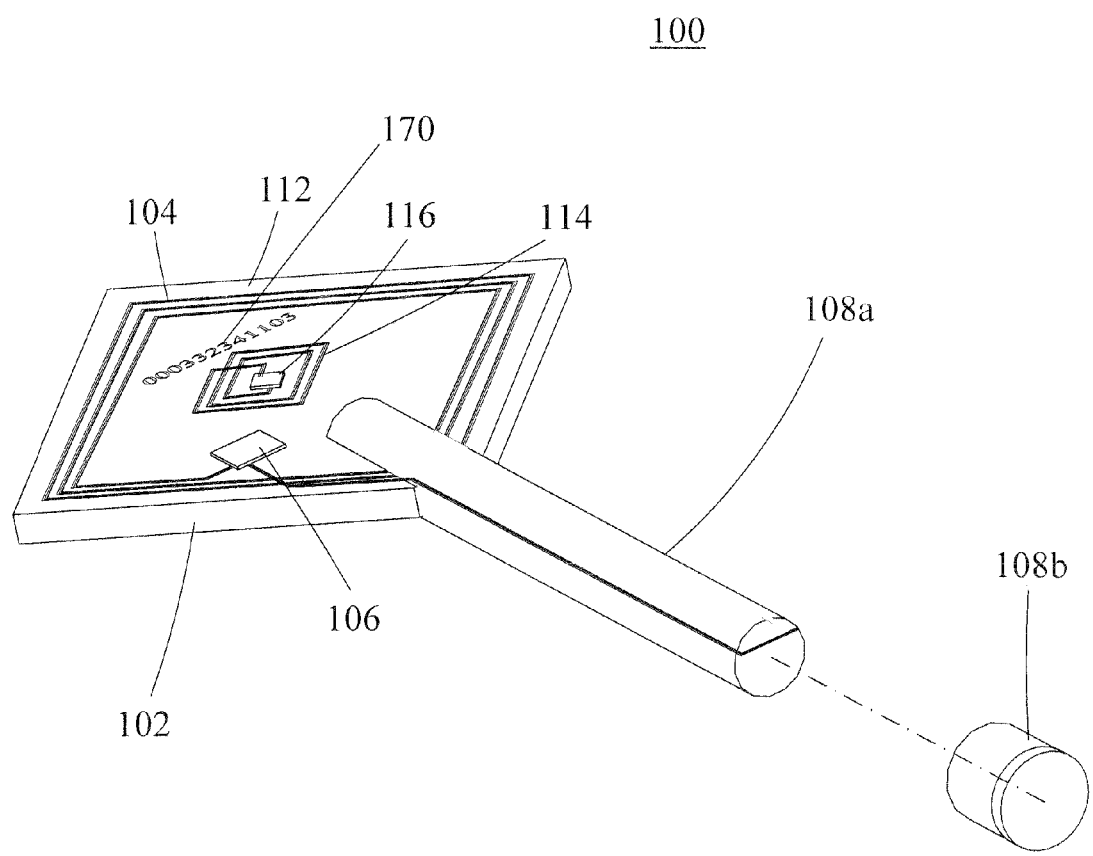
FIG. 3 is an exploded view of the device of the present invention.

The reception surface 112 includes preferred dimensions that allow the primary antenna 104 to be positioned about the periphery thereof. The present invention includes at least one antenna, and may include a primary antenna 104 and a secondary antenna 114 as FIG. 3 shows. Antennae are preferably embedded within the reception block 102 or protected by a signal translucent coating. The coating may include any plastic or other protective coating suitable to allow the transmission of radio signals therethrough while protecting the reception block and the components thereon and therein. The primary antenna 104 includes a thin metal strip affixed to an adhesive backing or a fine gauged wire. The primary antenna 104 connects to an RFID chipset 106, which may include one or more integrated circuit chips, shown here as a primary integrated circuit chip 106 and a secondary integrated circuit chip 116. The terms primary and secondary are used purely for the purpose of identification and may not necessarily be indicative of one component's utility with respect to another. The primary antenna 104 preferably spans the periphery of the reception surface or a cross-section plane of the reception block and extends along a mast assembly 108, shown as a mast 108a and a mast cap 108b. In passive versions of the RFID device 100, the primary antenna 100 is arranged both to collect power from incoming signals and also transmit an outbound signal powered according to induction created by an incoming signal. The structural interrelationship between the mast assembly 108 and the primary antenna 104 creates a substantial security mechanism of the present invention.

Antennae of the present invention are configured to have a certain resonance frequency, so that the antenna receives new information through radio communication with a signal module (not shown) to store the information by integrated circuit chip or transmit the information from the integrated circuit chip to the signal module. The antenna of the present invention may be formed by any process known in the art, including chemical and ink insulating film etching. In a preferred version of the RFID device 100, the primary antenna 104 spans the periphery of the reception block 102 and extends longitudinally along opposing portions of the mast 108a. The primary antenna 104, upon reaching the terminus, i.e. the base, of the mast 108a meets thereon to form a conductive loop. The ability of the primary antenna 104 to form a closed loop allows a dual-role as a power-generation unit and transmission/reception unit. The mast 108a connects to the mast cap 108b in a manner that creates a one-way bond such that removal of the mast cap 108b from the mast 108a destroys the integrity of the primary antenna 104 closed loop nature. Destruction of the closed loop hinders, or eliminates, the ability of the primary antenna from transmitting and receiving data signals; and in passive versions of the RFID device 100, may destroy the ability of the primary antenna of the RFID device 100 to generate power through signal reception. Attempts to cut, twist, or pry the mast cap 108b from the mast 108a indicate container tampering.

The primary antenna 104 connects to the chipset and preferably only to the primary integrated circuit chip 106. However, alternate versions of the RFID may include advantageous arrangements of multiple integrated circuit chips connected to a single antenna, or multiple antennae connected to multiple integrated circuit chips. In the RFID device 100 of FIG. 3, the primary antenna 104 connects only to the primary integrated circuit chip 106, and a secondary antenna 114 connects only to a secondary integrated circuit chip 116.

Integrated circuit chips 106, 116 of the present invention are electrically connected to antennas 104, 114, so that the chip may be powered by energy produced due to an electromagnetic field induced according to well known principals of power-induction from a signal transmission to store, retrieve, and update information. RFID integrated circuit chips 106, 116 electrically connected to a terminal of the antennas 104, 114 through an anisotropic conductive film or other suitable adherent.

The primary integrated circuit chip 106 is positioned on the reception block 102, preferably on or embedded into the reception surface 112. Commercially available integrated circuit chips may be utilized with the present invention. It is preferred that each reception block 102 include the primary integrated circuit chip 106 and the secondary integrated circuit chip 116. The primary integrated circuit chip 106 is used to provide an automatic identification function for the identity of the RFID device 100. The primary integrated circuit chip includes information suitable to allow identification of the device 100. In embodiments of the present invention, this information may include only that information necessary to return a Boolean value correlating to a response or non-response from the primary integrated circuit, Preferred embodiments of the present invention include additional information stored within the primary integrated circuit, such as an electronic security number, seal date, shipment method, shipment origin, shipment destination, shipment history, and the like. The primary integrated circuit chip 106 further provides radio frequency ("RF") data transmission/receipt, and provides data storage for additional verification information that may include specialized cryptographic information. The primary integrated circuit chip 106 includes an integrated circuit for storing and processing information, modulating and demodulating an RF signal, and other specialized functions for RF seal identification. It is preferred that the primary integrated circuit chip 106 and the primary antenna 104 be configured for RF transmission/receipt in the Ultra High Frequency (UHF) spectrum, which in combination with a peripherally positioned antenna about the preferred dimensions, allows for readings/transmissions of 10 meters and beyond. Distances permitted by transmission of the antennae of the present invention may be adjusted according to the specifications and advantages of integrated circuits and antennae existing at the time of use.

The secondary integrated circuit chip 116 is preferably positioned on the reception block 102 and on, or embedded, within the reception surface 112. The secondary antenna 114 connects to the secondary integrated circuit chip and is preferably positioned on the reception block 102 and on or embedded within the reception surface 112 completely within the inner perimeter of the primary antenna 106. Commercially available integrated circuit chips may be utilized as the secondary integrated circuit chip 116.

The secondary integrated circuit chip 116 is used to provide an automatic identification function for the identity of the RFID device 100. It is further preferred that the secondary integrated circuit chip 116 include data, either written or inherent, that cross-references data of the primary integrated circuit chip 106. In some versions of the RFID device 100, the secondary integrated circuit chip 116 may include only information present on the primary integrated circuit chip 106, only information that corresponds in an identifying manner to information present on the secondary integrated circuit chip 116, and most preferably information that includes electronic security number, seal date, shipment method, shipment origin, shipment destination, shipment history, and the like. Preferred embodiments of the present invention utilize the secondary integrated circuit chip, when present, as the principal means of data storage of the device. The secondary integrated circuit chip includes an electronic security number individual to the device that identifies the device from other like devices. Embodiments of the present invention may include a physical identifier 170 that includes a physical reproduction of the electronic security number. The preferred physical identifier 170 is laser etched into the exterior of the device, preferably onto the reception surface 112. The physical identifier 170 may also include a physical reproduction of an electronic security number of the primary integrated circuit, which may be similar to the electronic security number of the secondary integrated circuit, either singly or in combination with the physical reproduction of the electronic security number of the physical reproduction of the secondary integrated circuit electronic security number. The electronic security number may be any sequence capable of reproduction into a numeric, alphabetical, alpha-numerical, or other like sequence.

The secondary integrated circuit chip 116 further provides ("RF") data transmission/receipt, and provides data storage for additional verification information that may include specialized cryptographic information. The secondary integrated circuit chip 116 includes an integrated circuit for storing and processing information, modulating and demodulating an RF signal, and other specialized functions for RF seal identification. As the primary integrated circuit chip 106 on a non-function RFID device 100 will be incapable of providing information to a signal module, it is the function of the secondary integrated circuit chip 116 to provide identification information to the signal module to ascertain data related to the non-functional RFID device 100. The secondary integrated circuit chip 116, as is it need not be the primary means of identifying the shipping container in transit, may include a secondary antenna capable of low frequency transmissions. It is preferred that the secondary integrated circuit chip 116 and the secondary antenna 114 be configured for RF transmission/receipt at frequencies lower than that of the primary antenna 104, which in combination with a centrally positioned antenna, allows for readings/transmissions of less than a meter.

With reference to FIG. 3 and FIG. 1, in operation a user places the RFID device shown into a container bolt hole 304. In doing so, the user first places the mast 108a into the bolt hole 304 and then fastens the mast cap 108b upon the mast 108a. The mast cap 108a may include any number of mechanisms that grasp, straddle, or cling to the primary antenna 104 positioned on the terminus of the mast 108a. The user may then use a signal module 200 having data entry inputs 204 and a data display screen 202 to read and write information onto the primary integrated circuit 106 or the secondary integrated circuit 116. The signal module 200 may work in cooperation with the chipset and antennas of the RFID device 100 to remotely power the RFID device 100 such that a power source incorporated into the RFID would be unnecessary. Preferred signal modules of the present invention include the MOTOROLA SYMBOL XR440 RFID Reader and MC9090-G RFID Gun Terminal and THINGMAGIC ASTRA 1000. The signal module may communicate with the RFID device, the central authority, or a second signal module. The signal module acts as a short distance reader/write in relation to the RFID device and may act as a long distance information conduit to the central authority. The central authority includes any association, business, or party that intends to informationally interact with the RFID device in a manner other than a line-of-sight transaction, preferably through the signal module intermediary.

The RFID device 100 may include one or more power sources to power any portion of the RFID device 100. The RFID device 100 may include a power source that powers all functions of the RFID device 100, no power source and rely on the signal reception for all necessary functions, or a power source that only powers one or more of the integrated circuit chips but does not power signal through one or more of the antennae. An additional application for any power source of the present invention is to power data storage and transmissions for future data transfers. The signal module may include encryption and decryption functions, and preferably provides long-range transmissions to a central authority for the RFID device 200.

The RFID device 100 possesses the structural ability to withstand prolonged transportation and remains inactive until read by another signal module 200 or acted upon (e.g. written upon) by another signal module 200. The signal modules 200 of the present invention may be stationary or portable. Dislocation of the mast cap 108b from the mast 108a severs the primary antenna 104, but not the secondary antenna 114. Destruction of the closed loop nature of the primary antenna 104 prevents the primary antenna 114 from being read in particular embodiments, but as the location of the secondary antenna is substantially distinct from the mast 108a, it is presumably unaffected—barring tampering actions unrelated to the separation of the mast 108a from the mast cap 108b. The signal module 200 may read the data of the secondary integrated circuit chip to ascertain data written thereon, which may include data existing upon the primary integrated circuit but rendered unavailable due to RFID device 100 tampering.

Figure 4:
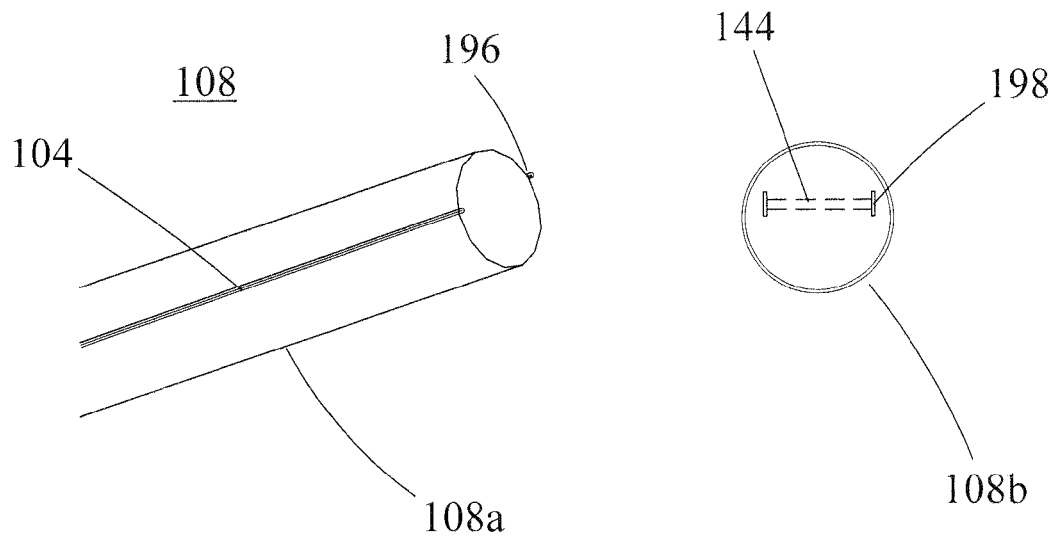
FIG. 4 is a partial, perspective view of the device of the present invention.
Figure 5:
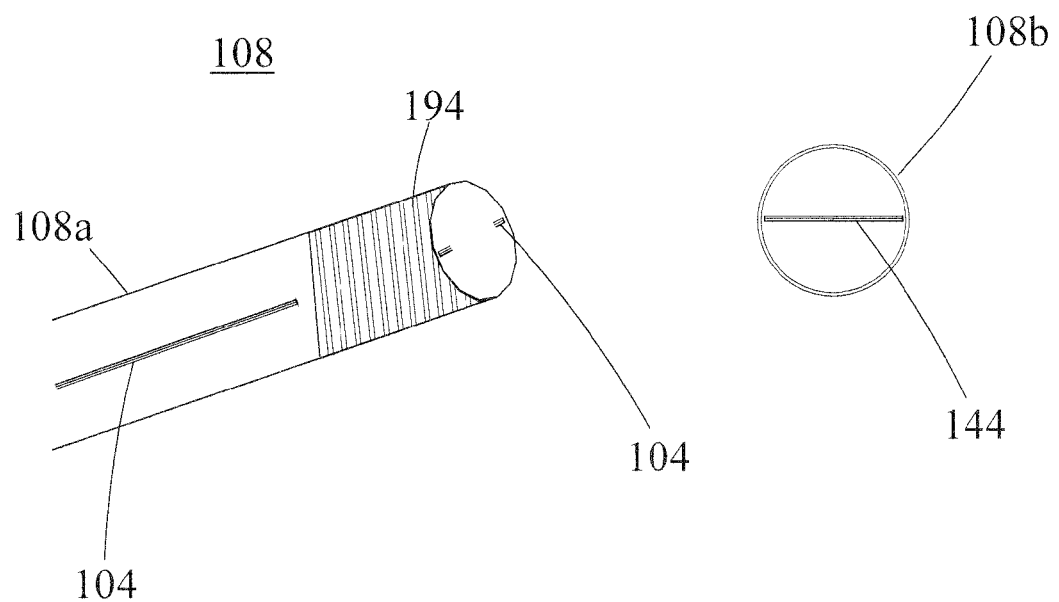
FIG. 5 is a partial, perspective view of the device of the present invention.

Placement of the mast cap 108b onto the mast 108a creates a secure connection that may only be removed in a fashion destructive to the closed loop nature of the primary antenna 104. Turning now to FIG. 4 and FIG. 5, the mast assembly 108 includes the mast 108a and mast cap 108b of the present invention. As FIG. 4 shows, the primary antenna 104 may run longitudinally down the length of the mast 108a to the terminus thereof and end in a pair of primary antenna projections 196. The antenna projections 196 may be received by primary antenna slots 198 that create a closed loop connection with an internal primary antenna bridge 144 portion within the mast cap 108b. The primary antenna bridge 144 is a primary antenna portion adapted to connect with a portion of the initially open-ended primary antenna to form a closed loop primary antenna that is may then be permanently severed upon removal of the primary antenna bridge from the initially incomplete primary antenna portion. Initial separation of the primary antenna 104 that creates a closed loop only upon fixation of the mast cap 108b, and that then permanently severs the closed loop nature of the primary antenna 104 upon removal of the mast cap 108b is an aspect of the present invention.

As FIG. 5 shows, the primary antenna 104 may be internally embedded within the mast 108a, particularly in versions of the RFID device 100 that include threading 194 to attach to a threaded mast cap 108b. All antennae and integrated circuits of the present invention may be placed on an exposed surface, on a sub-surface protected from the environment merely by a layer of protective material, or wholly internally within the device. Use of "surface" in the present disclosure relates to "surface" and "sub-surface." Placement upon the surface, subsurface, or encased within a substantially solid or substantially open interior constitutes being supported by a component. FIG. 5 depicts an embodiment of the RFID device 100 with an initially separated primary antenna 104 that creates a closed loop primary antenna upon affixation of the mast cap 108b. The mast 108a terminus includes an incomplete primary antenna portion that is adapted to be completed by the primary antenna bridge 144 located upon an interior surface portion of the mast cap 108b.

Figure 6:
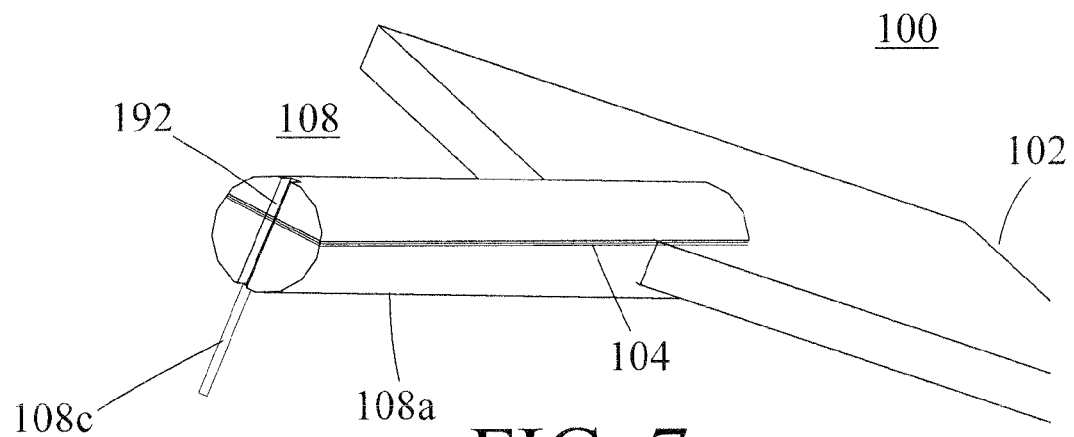
FIG. 6 is a partial, perspective view of the device of the present invention.
Figure 7:
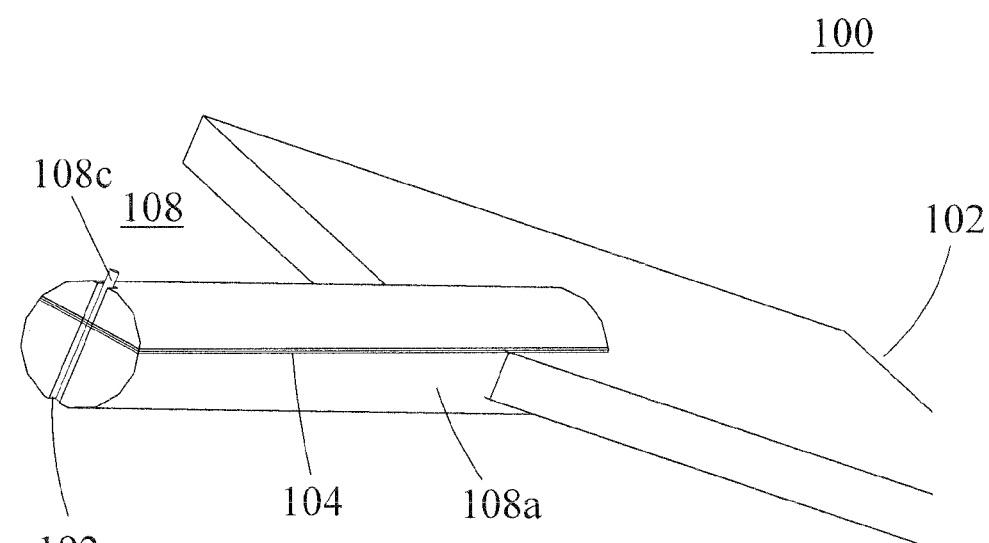
FIG. 7 is a partial, perspective view of the device of the present invention.
Figure 8:
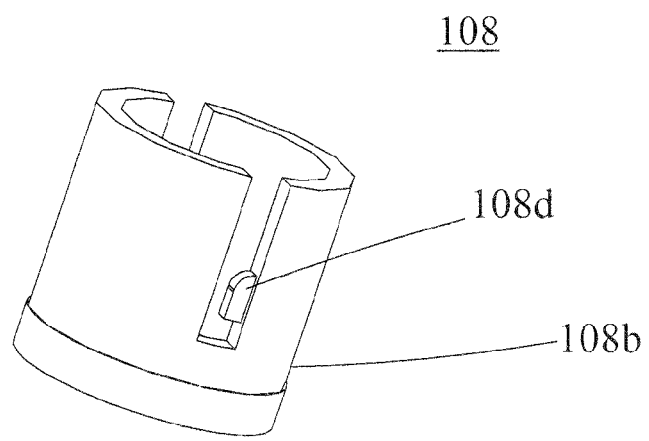
FIG. 8 is a perspective view of the mast cap of the present invention.

As FIGS. 6-8 show, the mast assembly 108 may include any number of components advantageous to achieve the benefits of the mast assembly 108. The pictured RFID device 100 includes a mast 108a, mast cap 108b, impediment 108c, and grip 108d. As is common to many embodiments of the cap-and-mast versions of the mast assembly, the mast cap 108b fits upon the terminus of the mast 108a. However, prior to affixation of the mast cap 108b upon the mast 108a, an impediment 108c is positioned within a mast assembly groove 192. It is preferred that the impediment is permanently affixed therein, such as with an adhesive or mechanical means. The mast cap 108b includes a depressible grip 108d that sinks within the mast cap 108b upon initial contact with the impediment 108c as the mast cap 108b is placed upon the terminus of the mast 108a. As the impediment 108c is positioned further into the mast cap 108b, the depressible grip 108d returns to its natural state of protrusion and locks the impediment 108c into place between the grip 108d and the portion of the primary antenna 104 positioned on the terminus of the mast 108a.

Figure 9:
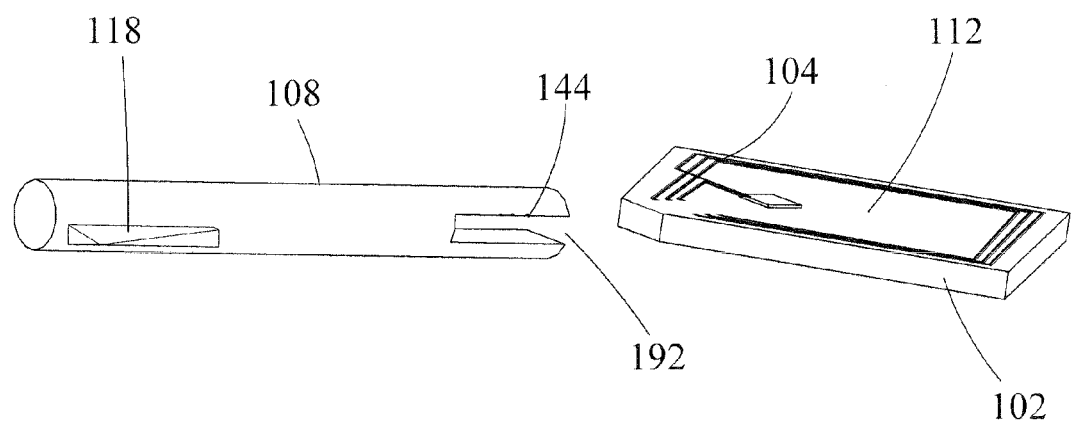
FIG. 9 is a perspective view of the device of the present invention.
Figure 10:
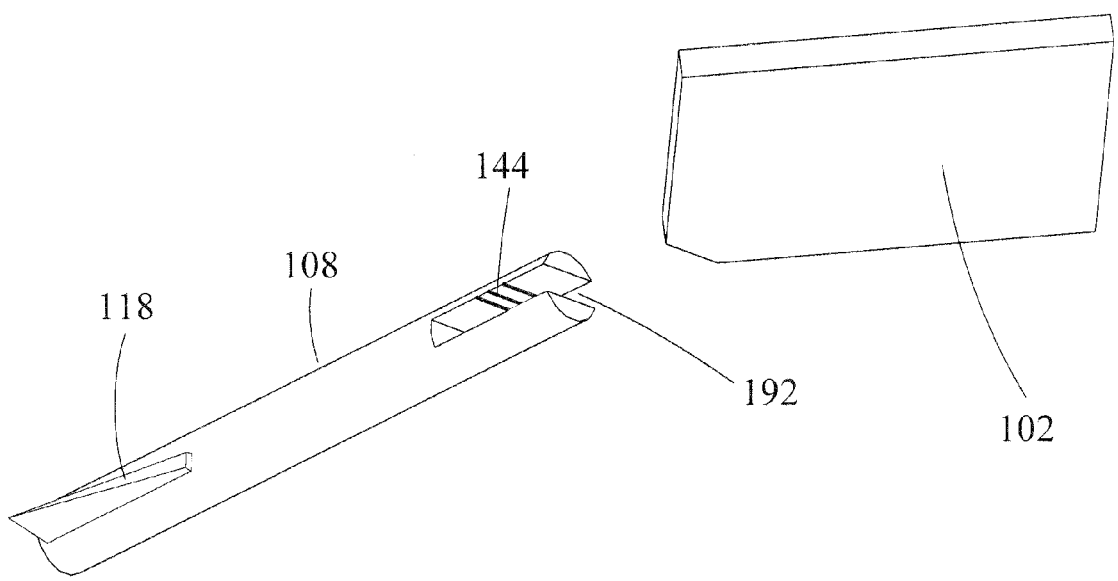
FIG. 10 is a perspective view of the device of the present invention.
Figure 11:
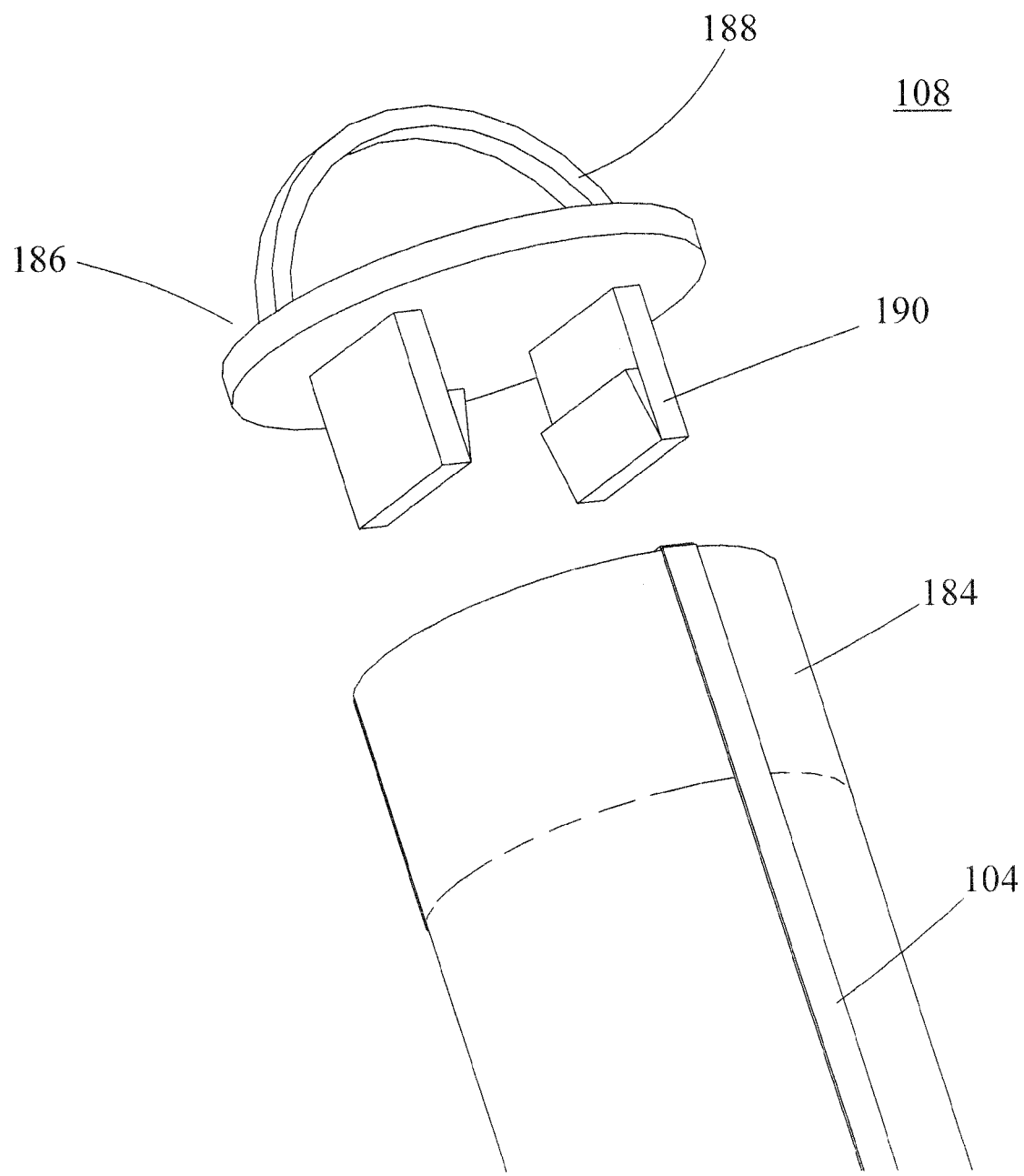
FIG. 11 is a partial, perspective view of the mast assembly of the present invention.
Figure 12:
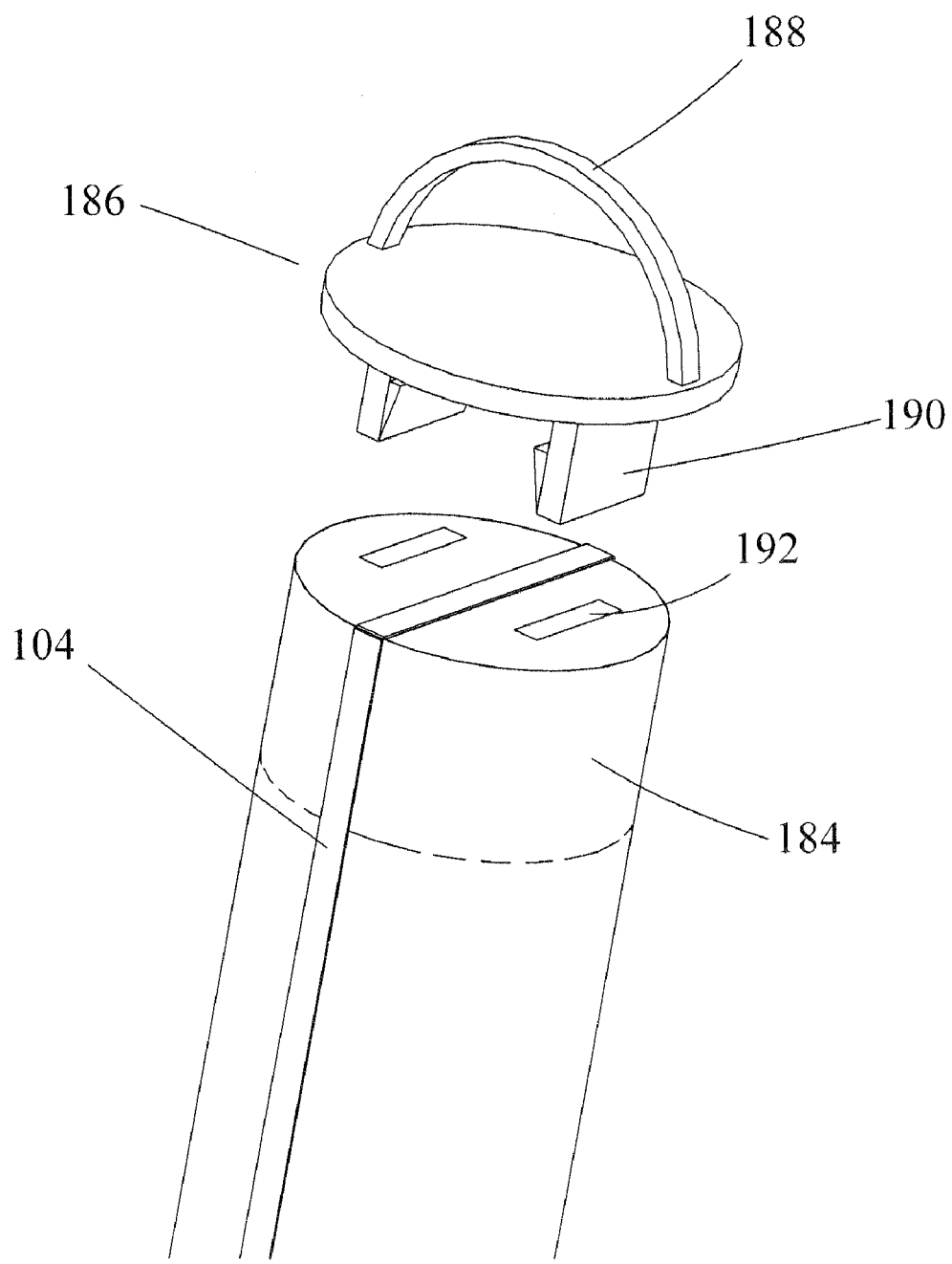
FIG. 12 is a partial, perspective view of the mast assembly of the present invention.
Figure 13:
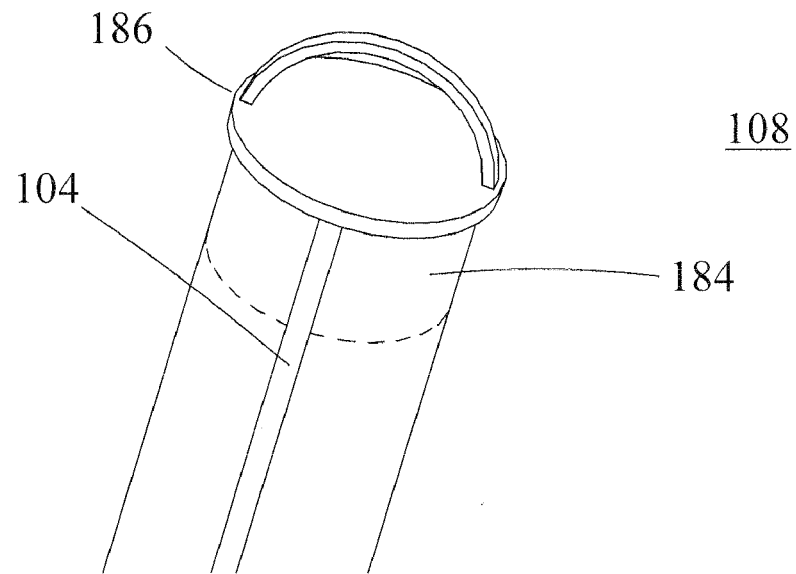
FIG. 13 is a partial, perspective view of the mast assembly of the present invention.
Figure 14:
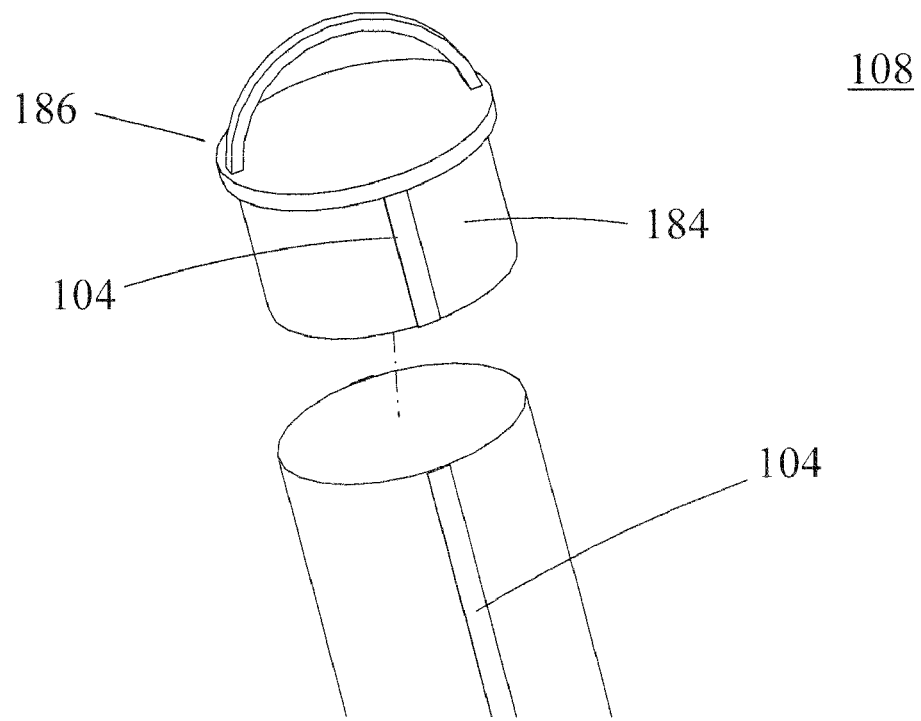
FIG. 14 is a partial, perspective view of the mast assembly of the present invention.
Figure 15:
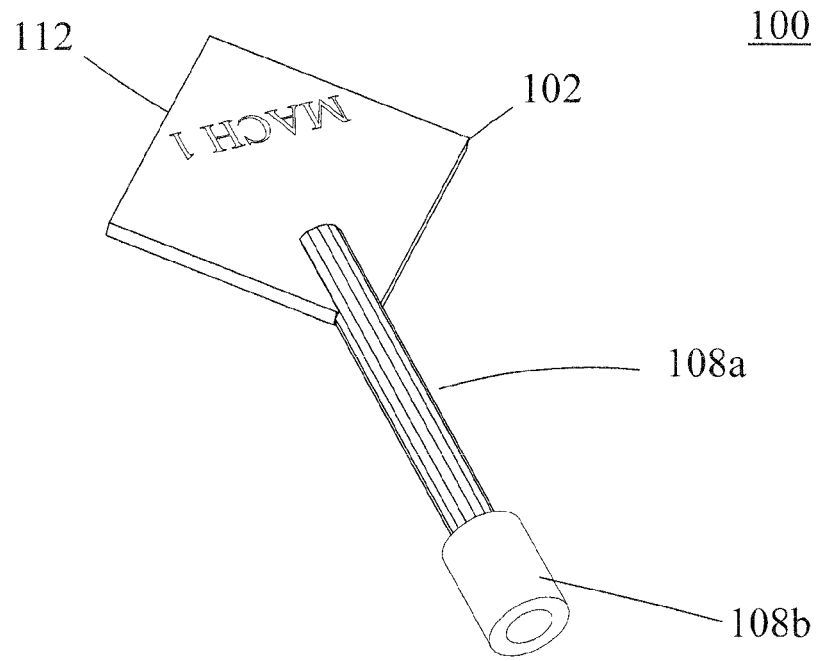
FIG. 15 is a perspective view of the device of the present invention.
Figure 16:
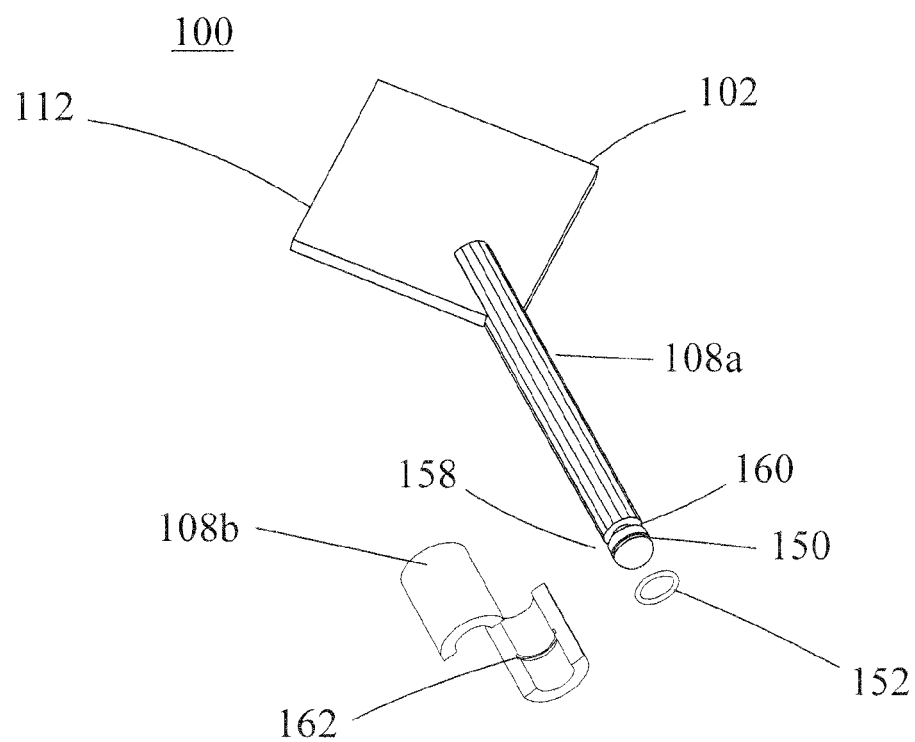
FIG. 16 is a perspective view of the device of the present invention with a cross-sectional view of an embodiment of the mast cap.
Figure 17:
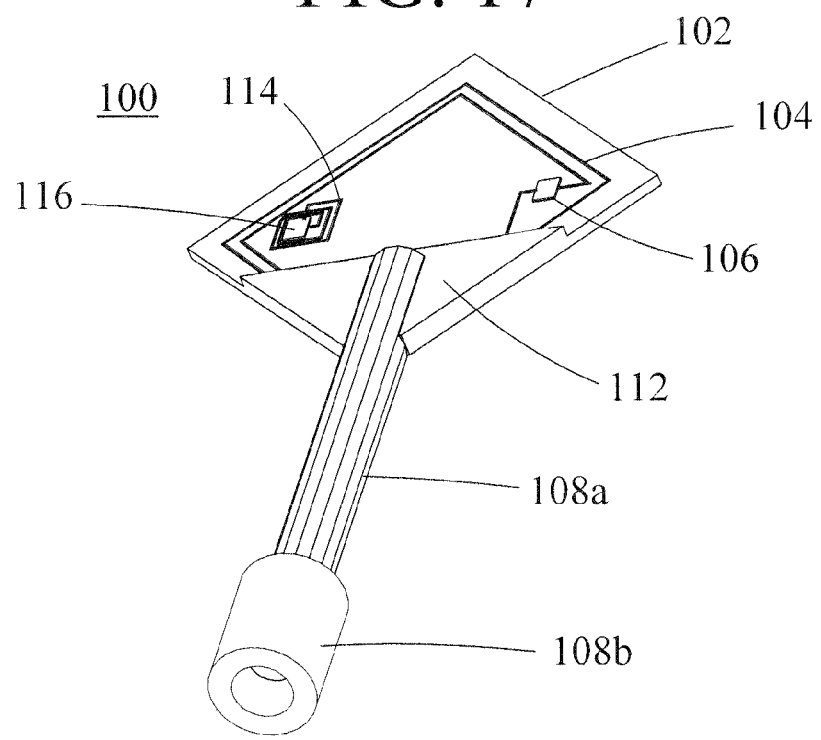
FIG. 17 is a partially exposed view of the device of the present invention.

As FIG. 9 and FIG. 10 show, the mast assembly 108 of the RFID device 100 need not include multiple components or a distinct mast and mast cap. The RFID device 100 of FIGS. 9-10 is separated not proximate to the mast assembly terminus, but proximate to the reception block 102. The reception surface 112 supports the primary antenna 104 arranged in multiple concentric bands. The mast assembly 108 includes a mast assembly groove 192 dimensioned to both accept the dimensions of the reception block 102 and position a mast assembly antenna bridge 144 upon the incomplete portions of the primary antenna 104 upon the reception surface 112. Unlike cap-and-mast versions of the RFID 100, forced separation of the pictured RFID device 100 occurs proximate to the reception block 102 whereby the mast assembly 108 removes the antenna bridge or destroys the antenna bridge positioning in a manner adapted to destroy the closed loop integrity of the primary antenna 104.

The RFID device 100 bearing a separation point proximate to the reception block 102 must include a mast assembly of differential diameter. The use of the present invention relies upon the differential nature of the various components to achieve security benefits. The reception block 102 includes a width substantially greater than the width of the mast assembly 108. The mast assembly 108 must include at least two distinct dimensions that may be either sharply differential, such as a cliff, uniformly differential, such a gentle incline, or some combination thereof. Mast-and-cap versions of the RFID device 100 may rely on the likely sharp width differentiations between the mast cap (not shown) and the mast (not shown). Versions of the RFID device 100 lacking a distinct mast and mast cap, may include a gentle incline toward the terminus of the mast assembly 108, sharp incline toward the terminus of the mast assembly 108, or some combination thereof. As the mast assembly 108 lacks a cap to provide width differential, the mast assembly includes a mast assembly protrusion 118 to provide suitable width differential. The width differential is suitable when the reception block width is greater than a centrally-located width of the mast assembly, which in turn is less than a distally-located width of the mast assembly. Such a width distribution permits the RFID device 100 to sit within a bolt hole (not shown) in a manner that prevents longitudinal motion that dislocates the RFID device 100 entirely from the bolt hole and prevents a trespasser access to the interior of the container without destruction of the RFID device along its mast assembly 108. When a mast assembly protrusion 118 is used, it is preferred that it include a structural integrity greater than or approximately equal to structural integrity of the mast assembly 108.

FIGS. 11-14 depict a plug version of the mast assembly 108. The mast assembly 108 includes a plug 186 with prongs 190 of differential width that fit within mast assembly grooves 192 positioned on the terminus of the mast assembly 108. The prongs 190 include a differential width that allows insertion into the mast assembly grooves 190, which also include a differential interior width. Sharp differential portions of the prongs 190 and the interior portions of the mast assembly grooves 190 matingly cooperate to provide two substantially planar surfaces that form an interlocking fit. The mast assembly 108 includes a frangible mast assembly portion 184 forming a substantially weak adhesion to the remainder of the mast assembly 108. The bond strength of the frangible mast assembly portion 184 to the remainder of the mast assembly is weaker than the bond strength of the plug 186 to the frangible mast assembly portion 184. A longitudinal dislocating force pulls the frangible mast assembly portion 184 from the mast assembly 108 rather than the plug 186 from the frangible mast assembly portion 184. Dislocation of the frangible mast assembly portion 184 severs the closed loop nature of the primary antenna 104.

FIGS. 15-22 depict a buried embodiment of the RFID device 100. The buried embodiment preferably includes the primary integrated circuit 106 and the secondary integrated circuit 116 disposed within the reception block 102. The reception block 102 is fabricated of a plastic that encompasses and fully encloses the primary integrated circuit 106, the secondary integrated circuit 116, the primary antenna 104, and the secondary antenna 114. The reception block 102 and the mast 108a preferably consist of a unitary entity that enclose their respective components. The preferred buried device 100 includes a mast that terminates in a mast base characterized by a fissure recess 160 connected to a mast knob 158. The mast knob 158 is an entity bearing a sidewall dimensioned to sealingly engage an interior wall of a mast cap 108b adapted to slide upon the mast 108a. The knob 158 may include a knob recess 150 of recess dimensions less than that of the fissure recess 160 preceding the knob 158. The knob recess 150 is dimensioned to accept a retention ring 152 for placement within the knob recess 150 and within a cap recess 162 positioned upon the interior sidewall of the mast cap 108b. The retention ring 152 may be permanently affixed within the cap recess 162 or knob recess 150, or may be a distinct entity capable of time-discriminated positioning in relation to the knob and mast cap. The retention ring includes an elastic material capable of providing radial contortion sufficient to allow the mast cap 108b to slide over the knob 158 and position the knob recess directly over the cap recess.

The retention ring 152 in conjunction with a recess, either the knob recess or the cap recess, acts to create with the component bearing that recess an interference fit in relation to the recess of the mating component, either the knob or mast cap.

The mast cap 108b of the buried device for positioning upon the knob 158 preferably includes longitudinal dimensions sufficient to extend well beyond the terminus of the knob. Such dimensions minimize the ability of objects to be inserted within the mast cap 108b to physically manipulate the retention ring 152. Embodiments of the present invention may further include a mast cap 108b with an endwall dimensioned to eliminate access to the retention ring 152. The preferred dimensions of the mast cap 108b are further such that the mast cap 108b covers the fissure recess 160 to prevent manipulation of the gulf between the mast proper and the knob terminus of the mast. For example, the body of mast cap 108b, when positioned, acts to prevent an unauthorized user from bolstering the connection between the mast knob and the mast proper with an adhesive or other construction component capable of increasing the force required to rend the knob from the mast. The buried device 100 preferably includes a substantially solid mast and reception block, i.e. the mast and reception block are solid with the exception of the space occupied by components such as the antennae and chipset.

Figure 18:
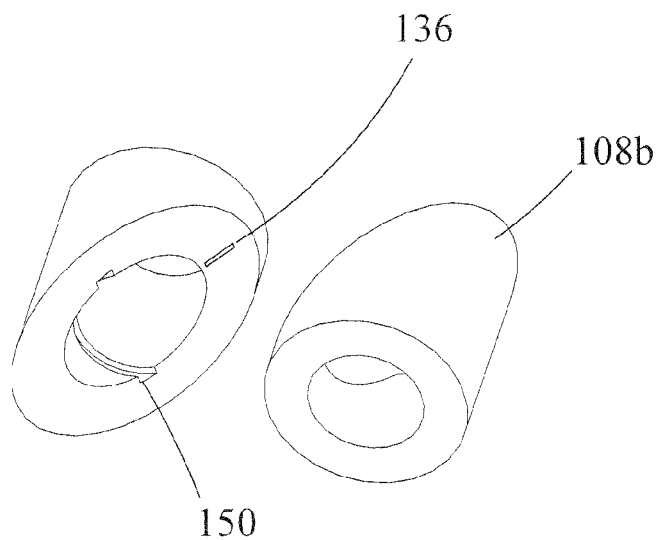
FIG. 18 is a cross-sectional view of an embodiment of the mast cap.
Figure 19:
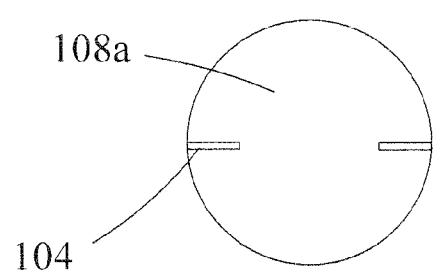
FIG. 19 is a cross-sectional view of the mast.

Upon application of sufficient force, the knob 158 may be removed from the mast 108a, taking the mast cap 108b with the knob 158 in the process. The fissure recess 150 may be adjusted in dimensions to selectively alter the force necessary to create a break in the mast 108a. As FIG. 19 shows, the mast 108a of the buried device includes the primary antenna 104 within the body of the mast 108a. The primary antenna 104 winds to the terminus of the mast 108a such that it converges within the knob and is removed with the knob upon a break proximate to the fissure recess. As FIG. 18 shows, the buried device preferably includes a verification integrated circuit 136 within the mast cap 108b. The verification integrated circuit 150 includes a verification antenna (not shown) capable of short range transmissions. The verification integrated circuit includes information and data sufficient to verify that the primary integrated circuit, secondary integrated circuit—if present, and the verification integrated circuit are valid components of a verified unit.

verified unit is a device 100 of the present invention that is manufactured to be utilized as a set. For example, the device may be distributed to users in two, or perhaps more, portions; the verified unit ensures that each portion is manufactured to be used with specific other portions and discovery of later deviation from those specific portions indicates tampering. The primary integrated circuit and secondary integrated circuit may broadcast a signal corresponding to an identification value and the verification integrated circuit may broadcast a short range signal capable of readily-verified relation to the identification value of the primary integrated circuit and secondary integrated circuit.

Figure 20:
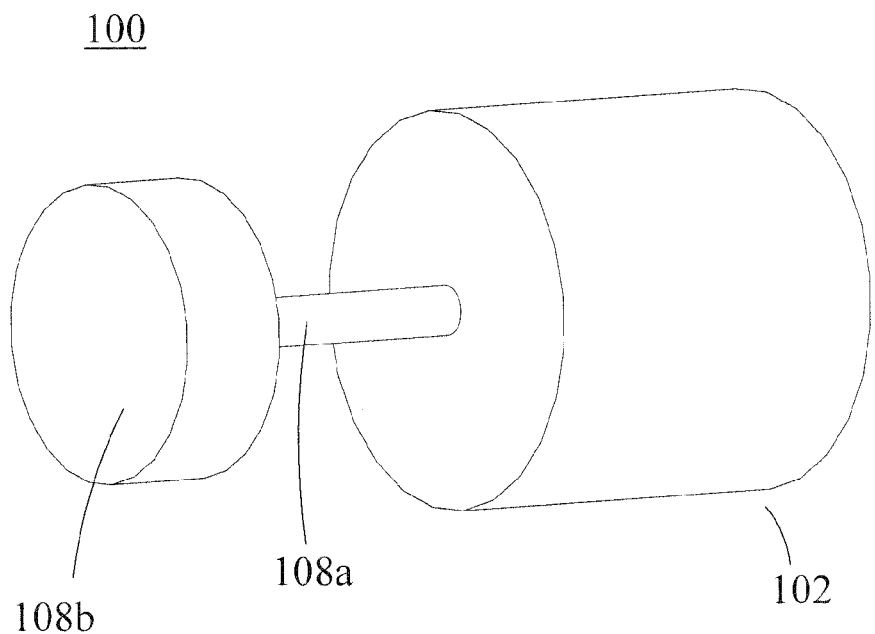
FIG. 20 is a perspective view of the device of the present invention.
Figure 21:
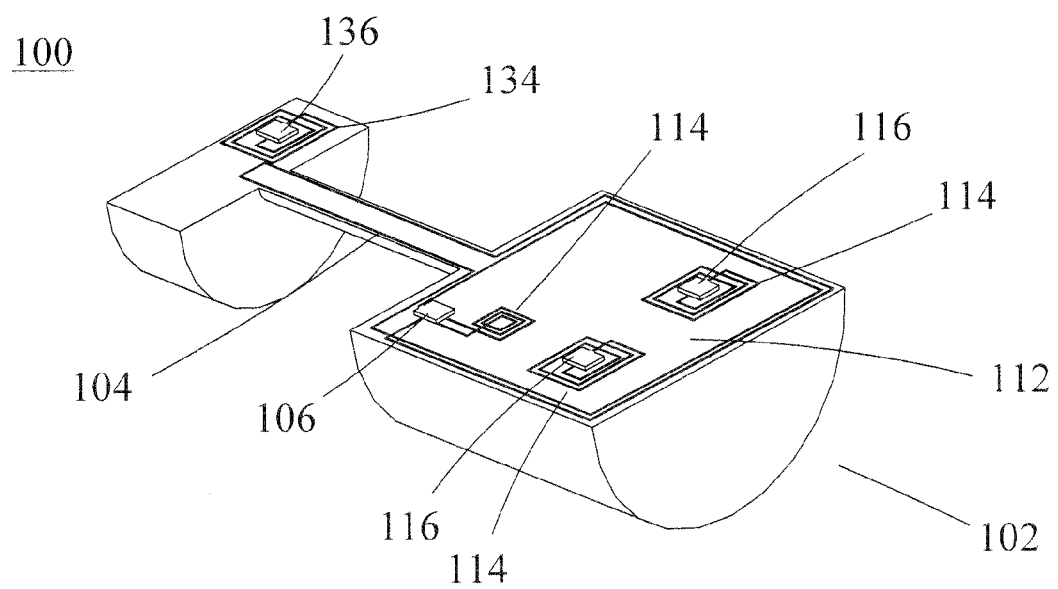
FIG. 21 is a cross-sectional view of the device of the present invention.
Figure 22:
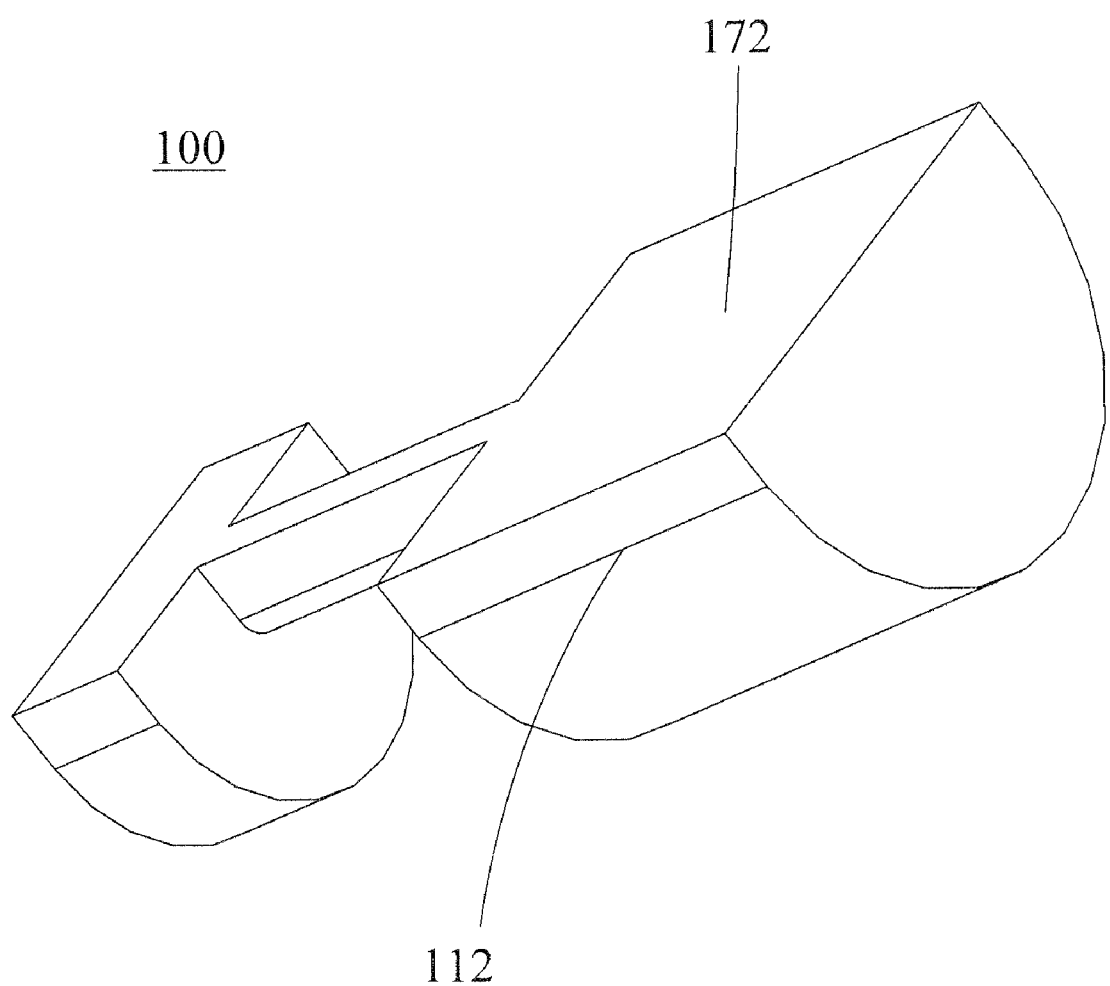
FIG. 22 is a perspective view of the device of the present invention.

With specific reference to FIGS. 20-21, the RFID device 100 may include non-substantially-planar dimensions. The reception surface 112 may be enclosed within the reception block 102 and feature multiple primary integrated circuits 106, multiple secondary integrated circuits 116, multiple secondary antennae 114, and multiple primary antennae 104. Similarly multiple verification integrated circuits 136 and multiple verification antennae 134 may be present in the RFID device 100. It is preferred that all antennae and integrated circuits of the reception block 102 are located on a single reception surface occupying a planar cross-section of the RFID device 100. Location on a single reception surface 112 is unnecessary, and in embodiments featuring multiple reception surfaces, it is preferred that the reception surfaces are parallel planar to each other reception surface. The exterior surface(s) of the RFID device may include rounded dimensions suitable to allow the RFID device to roll within a latch, or include dimensions adapted to prevent severance of components other than the pre-intended fracture zones proximate to the mast 108a. As. FIG. 22 shows, the backwall 172 of the RFID device 100 may include a planar character, in contrast to its distal surface, to prevent rolling yet continue to allow for increased girth to deter cutting of the RFID device.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A radio frequency identification device comprising:
    a reception block with a substantially planar reception surface and a reception block width;
    a chipset with a primary integrated circuit chip supported by said reception block;
    an elongate mast assembly, extending from said reception block, with a mast assembly width substantially less than said reception block width that increases distally from said reception block, and said mast assembly having a mast assembly separation zone adapted to transversely dislocate a portion of said elongate mast assembly; and
    a closed-loop, multiple-loop primary antenna, supported by said reception block and extending along said elongate mast assembly, with an antenna separation zone contacting said mast assembly separation zone and having a primary signaling capacity with a primary signal range.

2. The device of claim 1 wherein said mast assembly includes:
    a mast, extending from said reception block, having a mast width and a terminus; and
    a mast cap, dimensioned to internally accept said mast terminus, having a mast cap width greater than said mast width and less than said reception block width and adapted to grasp said antenna separation zone.

3. The device of claim 2 wherein said mast cap includes an antenna bridge with exposed antenna mast cap contacts and said closed loop antenna includes a discontinuous antenna loop portion, wherein said antenna mast cap contacts are adapted to create said closed loop antenna upon contact with said discontinuous antenna loop portion.

4. The device of claim 3 wherein said antenna separation zone is formed between said discontinuous antenna loop portion and said antenna mast cap contacts.

5. The device of claim 1 further comprising a closed loop secondary antenna, in signaled communication with said chipset, having a secondary signaling capacity with a secondary signal range, wherein said secondary antenna is disposed in a location consisting of said reception block.

6. The device of claim 5 wherein said secondary signal range is less than said primary signal range.

7. The device of claim 5 wherein said chipset includes a secondary integrated circuit chip, on said reception block, in signaled communication with said secondary antenna.

8. The device of claim 7 wherein said primary signaling capacity operates in a frequency range selected from a group consisting of UHF, VHF, and combinations thereof.

13

9. The device of claim 8 wherein said primary signaling capacity operates in a UHF frequency range.

10. The device of claim 9 wherein said secondary signaling capacity operates in a VLF frequency range.

11. The device of claim 7 wherein said primary antenna peripherally spans said reception surface.

12. The device of claim 11 wherein said secondary antenna is positioned on said reception surface completely within said primary antenna span.

13. The device of claim 7 wherein said secondary antenna and said primary antenna transmit data at substantially distinct frequencies.

14. The device of claim 7 wherein said primary integrated circuit chip is in electrical communication with transmission means consisting of said primary antenna, and said secondary integrated circuit chip is in electrical communication with transmission means consisting of said secondary antenna.

15. A radio frequency identification kit comprising:
a reception block with a substantially planar exposed reception surface and a reception block width;
a primary integrated circuit chip supported by said reception block;
a secondary integrated circuit chip supported by said reception block;
an elongate mast, extending from said reception block, having a mast width and a terminus and a mast separation zone;
a closed-loop, multiple-loop primary antenna, in sole signaled communication with said primary integrated circuit chip and positioned on said reception surface and peripherally extending along said elongate mast, with an antenna separation zone contacting said mast separation zone and having a primary signaling capacity with a primary signal range;
a closed loop secondary antenna, in sole signaled communication with said secondary integrated circuit chip, having a secondary signaling capacity with a secondary signal range, wherein said secondary antenna is disposed in a location consisting of said reception block; and
a mast cap, dimensioned to internally accept said mast terminus, having a mast cap width greater than said mast width and less than said reception block width and adapted to grasp said antenna separation zone and said mast separation zone.

16. The device of claim 15 wherein said mast cap includes an antenna bridge with exposed antenna mast cap contacts and said closed loop primary antenna includes a discontinuous antenna loop portion, wherein said antenna mast cap contacts are adapted to create said closed loop primary antenna upon contact with said discontinuous antenna loop portion.

17. The device of claim 16 wherein said antenna separation zone is formed between said discontinuous antenna loop portion and said antenna mast cap contacts.

18. The device of claim 16 wherein said secondary signal range is less than said primary signal range.

19. The device of claim 16 wherein said primary signaling capacity operates in a frequency range selected from a group consisting of UHF, VHF, and combinations thereof.

20. The device of claim 19 wherein said primary signaling capacity operates in a UHF frequency range.

21. The device of claim 20 wherein said secondary signaling capacity operates in a VLF frequency range.

22. The device of claim 21 wherein said secondary antenna and said primary antenna transmit data at substantially distinct frequencies.

14

23. A radio frequency device comprising:
a substantially solid reception block with an internal reception surface and a reception block width;
a chipset with a primary integrated circuit chip encased by said reception block;
a substantially solid, elongate mast assembly, extending from said reception block, with a mast assembly width substantially less than said reception block width that increases distally from said reception block, and said mast assembly having a mast assembly separation zone adapted to transversely dislocate a portion of said elongate mast assembly; and
a closed-loop, multiple-loop primary antenna, encased by said reception block and extending within said elongate mast assembly, with an antenna separation zone contacting said mast assembly separation zone and having a primary signaling capacity with a primary signal range.

24. The radio frequency device of claim 23 further comprising a physical identifier in a location selected from a position consisting of said reception surface of said reception block and said mast assembly.

25. The device of claim 23 wherein said device comprises a secondary integrated circuit chip encased within said reception block.

26. The device of claim 25 wherein said device comprises the closed-loop, multiple-loop primary antenna, in sole signaled communication with said primary integrated circuit chip; and a closed loop secondary antenna, in sole signaled communication with said secondary integrated circuit chip, having a secondary signaling capacity with a secondary signal range, wherein said secondary antenna is encased within said reception block.

27. The device of claim 23 further comprising a verification integrated circuit, encased within a mast cap of said mast assembly, bearing verification information adapted to verify said primary integrated circuit and a secondary integrated circuit as belonging to a verified unit.

28. The device of claim 27 wherein said device comprises a chipset with a secondary integrated circuit chip encased within said reception block.

29. The device of claim 28 wherein said device comprises the closed-loop, multiple-loop primary antenna, in sole signaled communication with said primary integrated circuit chip; and a closed loop secondary antenna, in sole signaled communication with said secondary integrated circuit chip, having a secondary signaling capacity with a secondary signal range, wherein said secondary antenna is encased within said reception block.

30. The device of claim 23 wherein all antennae encased within said reception block possess a single orientation upon at least one reception surface.

31. The device of claim 30 wherein all antennae encased within said reception block are co-planar about said reception surface.

32. A remotely monitorable shipping container security system comprising:
a shipping container body with a latch defining a latch aperture with a latch aperture diameter and a substantially planar container sidewall; and
a radio frequency identification device comprising:
a reception block with a substantially planar reception surface and a reception block width dimensioned to prevent an axial rotation of said reception block greater than 30 degrees when positioned proximate to said sidewall;
a chipset comprising a primary integrated circuit chip supported by said reception block;

an elongate mast assembly, extending from said reception block, and having a mast assembly width substantially less than said reception block width that increases distally from said reception block, wherein a reception block proximate portion of said mast assembly includes said mast assembly width less than said latch aperture diameter and a reception block distal portion of said mast assembly includes said mast assembly width greater than said latch aperture diameter, and said mast assembly having a mast assembly separation zone adapted to transversely dislocate a portion of said elongate mast assembly;

an external physical identifier, visibly situated on location selected from a group consisting of said reception block and said mast assembly, bearing a representation corresponding to an electronic security number of said chipset; and a closed-loop, multiple-loop primary antenna, on said reception surface and extending along said elongate mast assembly, with an antenna separation zone contacting said mast assembly separation zone and having a primary signaling capacity with a primary signal range.

33. The system of claim 32 further comprising a closed loop secondary antenna, in signaled communication with said chipset, having a secondary signaling capacity with a secondary signal range, wherein said secondary antenna is disposed in a location consisting of said reception block.

34. The device of claim 33 wherein said chipset includes a secondary integrated circuit chip, on said reception block, in signaled communication with said secondary antenna.

35. The system of claim 34 further comprising a transmission module adapted to write and read data from said primary antenna and write and read data from said secondary antenna.

36. The system of claim 35 further comprising a central authority, in signaled communication with said transmission nodule, adapted to accept and send distanced transmissions from said transmission module relating to data from said primary integrated circuit chip and said secondary integrated circuit chip.

* * * * *